United States Patent [19]

Romesberg

[11] Patent Number: 5,051,452

[45] Date of Patent: Sep. 24, 1991

[54] PROCESS FOR PREPARING FOAMED VINYLAROMATIC POLYMER PRODUCTS

[75] Inventor: Floyd E. Romesberg, St. Louisville, Ohio

[73] Assignee: The Dow Chemical Company, Midland, Mich.

[21] Appl. No.: 479,918

[22] Filed: Feb. 13, 1990

[51] Int. Cl.$^5$ .................. C08L 25/18; C08L 27/08
[52] U.S. Cl. .................... 521/139; 521/98; 521/907
[58] Field of Search .............. 521/139, 98, 907

[56] References Cited

U.S. PATENT DOCUMENTS

| 3,595,815 | 7/1971 | Willersinn et al. | 521/139 |
| 3,655,600 | 4/1972 | Stevens | 521/55 |
| 3,793,416 | 4/1972 | Finkmann | 264/53 |
| 4,035,315 | 7/1977 | Ingram | 521/139 |
| 4,241,191 | 12/1980 | Keppler | 521/56 |
| 4,506,037 | 3/1985 | Suzuki et al. | 521/139 |
| 4,699,810 | 10/1987 | Blakeman et al. | 521/139 |
| 4,730,009 | 3/1988 | Soredal | 521/87 |

Primary Examiner—Morton Foelak

[57] ABSTRACT

Novel polymeric blends comprising from 45-90% by weight of at least one vinylaromatic resinous material, 10-55% by weight of at least one vinylidene chloride polymer and, optionally but preferably, an effective amount of at least one blowing or expansion agent. The invention blends provide products having improved oxygen and water permeability, improved toughness, and improved flammability resistance.

14 Claims, No Drawings

PROCESS FOR PREPARING FOAMED VINYLAROMATIC POLYMER PRODUCTS

This invention relates to vinylaromatic polymer compositions, and especially vinylaromatic polymer compositions suitable for use as insulation media.

Over the past several decades, polymer foams have become available in a wide variety of forms, either in answer to a material need in industry or as a developmental expansion of commercialized precursors. Some of the more popular forms of foamed polymer compositions are shapes such as film, sheet, slab and profiles. Generally, these products are produced by extrusion methods in which the polymer is converted by heat and pressure into a homogeneous melt and forced through a die into the desired shape. To obtain a cellular structure, the plastic usually incorporates a blowing agent that decomposes under the heat of the extrusion process and releases gasses that cause the shape to expand. It is also possible to inject propellants directly into the melt.

Because of the favorable combination of properties, price and ease of processing, vinylaromatic polymers, especially polystyrenes, are widely used in preparing foam sheet, film and slab for such divergent end uses as packaging, pipe and tubing, construction and insulation. For example, expanded vinylaromatic polymers such as polystyrene are widely used in the insulation of freezers, coolers, truck bodies, railroad cars, farm buildings, roof decks and residential housing. Vinylaromatic polymer foams are also used as the core material for structural sandwich panels used in refrigerated truck bodies, mobile homes and recreational vehicles.

A particular attraction of foam products as insulating materials is derived from the low thermal conductivity of the expansion gas which in entrapped within the matrix polymer. For example, should the thermal conductivity of the gas in a polymer foam be considerably less than that of the polymer matrix, the composite thermal conductivity will be in direct proportion to the volume of incorporated gas. Aside from packaging, insulation constitutes the greatest market use of rigid foam materials, with vinylaromatic polymers, especially polystyrene, being one of the most widely used.

Notwithstanding the man fine qualities of vinylaromatic polymers such as polystyrene, they are not without limitations. For example, foam made from polystyrene resin readily burns, is somewhat brittle, and has high permeability to oxygen and nitrogen. The thermal conductivity of oxygen and nitrogen, especially when combined as air, is typically greater than the thermal conductivity of gasses such as the halogenated hydrocarbons which are most often used in preparing foams for insulation applications. The diffusion of air into the cells of the foamed material dilutes the blowing agent concentration and results in an increase in the thermal conductivity (K-factor) of the gaseous component of the foam accompanied by a corresponding reduction in R value, that is, insulation capability. In addition, the low thermal conductivity blowing agent gas eventually tends to permeate out of the polymer matrix, leading to a further increase in the "K-factor"or thermal conductivity, and a greater reduction or loss of insulation capability.

In addition to decreasing the foam's insulating capability, the escape of halogenated hydrocarbon gasses into the atmosphere is environmentally undesirable. Thus, it is most desirable if the escape of halogenated carbon gasses could be minimized, and it is at least equally desirable if the diffusion of air into the polymer matrix could also be minimized. It would also be advantageous if the brittleness of the vinylaromatic resin foams could be lessened by improving their toughness; and, as well, if the flammability of the foams could also be reduced.

SUMMARY OF THE INVENTION

The vinylaromatic polymer compositions of the invention comprise a blend comprising from 45 to 90 weight percent of at least one vinylaromatic polymeric material and from 10 to 55 weight percent of at least one vinylidene chloride polymeric material, said weight percentages being based on the combined weight of vinylaromatic and vinylidene chloride polymeric materials. Articles or products made from the invention compositions are characterized by an improved toughness, reduced permeability to vapor transmission, especially air; higher elongation at break; improved impact and shock resistance; and reduced flammability in comparison to unmodified vinylaromatic polymeric compositions.

DESCRIPTION OF THE PREFERRED EMBODIMENT

The invention will be described in detail with respect to the preferred embodiment, which is directed to foamable vinyaromatic polymeric compositions and to shaped objects produced from such compositions. It will, of course, be recognized that the invention is equally workable with non-foaming vinylaromatic polymeric compositions.

The vinylaromatic polymers which are employed in the present invention are well known articles of commerce. The vinylaromatic polymers include homopolymers of vinylaromatic monomers, copolymers of two or more vinylaromatic monomers, and interpolymers of at least one vinylaromatic monomer and at least one nonvinylaromatic monomer which is interpoly-merizable with vinylaromatic monomers. The vinylaromatic monomers have the characteristic formula $CH_2=CX-Ar$, wherein Ar is an aromatic radical, including various alkyl and halo-ring-substitute aromatic units of from 6 to 10 carbon atoms and X is hydrogen or an alkyl group having from 1 to 4 carbon atoms. Representative vinylaromatic monomers include styrene, o-methylstyrene, m-methylstyrene, p-methylstyrene, ethylstyrene, dimethylstyrene, alpha-methylstyrene, p-methoxystyrene, p-chlorostyrene, 2,4-dichlorostyrene, 2,5-dichlorostyrene, p-bromostyrene, alpha-methyl-p-methylstyrene, p-isopropylstyrene, vinylnapthalene, acetanapthalene, vinylanthracene, indene, p-cyanostyrene and the like. Exemplary of nonvinylaromatic monomers which can be polymerized with vinylaromatic monomers are unsaturated nitriles such as acrylonitrile, methylacrylonitrile, ethylacrylonitrile and mixtures thereof. Other nonvinylaromatic monomers which are copolymerizable with vinylaromatic monomers and which are suitable for use in the present invention are alpha/beta-unsaturated monobasic acids and derivatives thereof, such as acrylic acid, methylacrylic acid, ethylacrylate, butylacrylate, 2-ethylhexylacrylate, and the corresponding methacrylate esters thereof, such as methylmethacrylate, acrylamide, methylacrylamide, maleianhydride, N-phenylmaleiamide, dimethylmaleate, diethylmaleate, dibutylmaleate, the corresponding fumarates and the like.

Currently, it is preferred that the vinylaromatic resins contain at least 50% of at least one vinylaromatic monomer, and it is currently preferred that the vinylaromatic resins contain at least 50 weight percent styrene. Currently preferred vinylaromatic resins include polystyrene and styrene-acrylic acid copolymers, with the latter preferably containing from 0.2-10, most preferably 0.2-6 weight percent acrylic acid. The vinylaromatic polymers preferably have molecular weights of at least 50,000, and more preferably in the range from 100,000 to 500,000.

The blowing or expanding agents which are employed in the expandable vinylaromatic polymer compositions of this invention include those which have boiling point lower than the softening point of the expandable polymer composition and which do not dissolve the polymer. The expanding agents include aliphatic hydrocarbons such as propane, butane, isobutane, pentane, nelpentane, isopentane, hexane, and butadiene; aliphatic cyclic hydrocarbons such as cyclobutane, cyclopentane and cyclohexane; and halogenated hydrocarbons such as methylchloride, methylenechloride, dichlorofluoromethane, chlorotrifluoromethane, dichlorodifluoromethane, chlorodifluoromethane and trichlorofluoromethane. The expanding agents are typically employed in amounts in the range from 1 to 30% by weight of the total expandable polymeric materials. Currently, the halogenated hydrocarbons are preferred expansion agents particularly when the foamed product is to be used in insulating applications, because of the excellent thermal conductivity of the halogenated hydrocarbon. For example, the thermal conductivity of dichlorodifluoromethane is 0.065 BTU/hr - ft$^2$/in. of thickness while the thermal conductivity of air is 0.179 BTU/hr - ft$^2$/in. of thickness.

The vinylidene chloride polymeric materials which are blended with vinylaromatic resins in accordance with the invention are well known materials. Such polymers are characterized by the presence of at least 80% of recurring vinylidene chloride units having the structure $(CCl_2-CH_2)hd\ n$. The vinylidene chloride polymers are stereoregular, thermoplastic materials obtained by polymerizing vinylidene chloride alone, or preferably, in the presence of not more than 20 weight percent of other olefinicaly unsaturated monomers, such as vinyl chloride, methyl acrylate, methyl methacrylate, acrylonitrile and the like. If desired, small amounts, on the order of 0.5 to 3 percent, of an unsaturated acid such as itaconic acid can be included in the polymerization recipe. Currently, the preferred vinylidene chloride polymer is a copolymer of vinylidene chloride and methyl acrylate, with the amount of methyl acrylate being in the range from 5 to 18 weight percent, most preferably in the range from 8 to 15 weight percent. Amorphous vinylidene chloride polymers are particularly preferred, since our studies indicate that while crystalline and vinylidene chloride polymers are workable in the invention, the benefits which flow from the vinylaromatic polymervinylidene chloride polymer blends of the invention are both enhanced and longer-lasting when amorphous vinylidene chloride polymers are employed.

The novel blends of the invention are formed by any known method of heat blending polymeric materials. Preferably, the resins are melt blended, which results in a substantially homogeneous dispersion of th vinylidene chloride polymers as individual domains within the vinylaromatic polymer matrix. The resultant blend can be directly formed into non-expanded articles such as films, sheets or other shaped objects. In the preferred embodiment, the blend is cooled and particulated. The resulting particles are then employed in conventional processing equipment to form unexpanded articles, or, in the preferred embodiment, combined with a suitable expansion agent to produce blown film, sheets and other expanded shaped objects.

The use of crystalizable vinylidene chloride polymers in the invention provides products with a reduced air permeability and will reduce the flammability of vinylaromatic resins as well as improve the toughness of such polymers. The toughness does show a tendency to decline over time. Amorphous vinylidene chloride polymers, on the other hand, not only provide reduced air permeability and reduced flammability, but also any loss in toughness is substantially more gradual. In addition, the amorphous vinylidene chloride polymers have a greater effect on reducing the brittleness of aromatic resins, particularly polystyrenes.

The invention is especially suited for producing low density foam products, that is, density of 5 lbs. per cubic foot or less. Generally, such low density foams cannot be made by known techniques from vinylidene chloride polymers because of the lack of thermal stability and poor solubility of low cost blowing (expansion) agents.

The present invention provides a means of significantly altering the composition of vinylaromatic resins while yet being able to make useful expanded an foamed products containing up to 50% vinylidene chloride polymer materials. While the mechanism by which the invention is operable is not understood, it appears that the individual domains of the vinylidene chloride resin within the vinylaromatic resin matrix are able to form a multilayer network of vinylidene chloride polymer within the vinylaromatic resin matrix, which appears to result in improved barrier properties as well as a reinforcement of the matrix resin for improved toughness. As indicated, supra, the improvements in the vinylaromatic resin are more noticeable when amorphous vinylidene chloride polymers are used. Generally, the amorphous vinylidene chloride polymers retain their fiber-forming characteristics and are more easily stretched when the resin blend is formed into a product. The effects of the invention are also more noticeable when the resin blends are combined with an expansion agent. When such blends are expanded, the amorphous vinylidene chloride resin readily stretches to provide increased barrier properties which result in improved thermal conductivities (higher R value) in that the gas composition remains enriched with the aliphatic halogenated hydrocarbon blowing agent as a function of time. That is, the improved barrier properties reduce the transmission of air from the ambient atmosphere into the cell, which transmission results in a reduction in the blowing agent concentration. The higher thermal conductivity of the air significantly reduces the value of the foam product as an insulation medium.

Both crystalline and asmorphous vinylidene chloride resins provide a chlorine content which is high enough to make the resulting products self-extiguishing with charring occurring rather than melt dripping during burning.

The invention is further illustrated by the following examples. In these examples, all amounts are in parts by weight, unless otherwise noted.

EXAMPLE 1

20 parts of as vinylidene chloride polymer (vinylidene chloride -90, methylacrylate -10, itaconic acid -0.7) was melt blended with 30 parts of as vinylaromtic polymer (styrene -99, acrylic acid -1) in a Brabender at 170° centigrade for three minutes. The resulting mix was cooled and ground in a Wiley Mill rotary knife cutter. Small tensile bars were molded and tested on a conventional tensile tester. The properties of this invention blend were compared against identical tensile bars molded from polystyrene, identified hereafter as PS-1, and a styrene-acrylic acid copolymer containing one weight percent acrylic acid, identified in the examples as SAA-1. The invention blend is identified as INV-1. In addition, the invention blend was heated for one hour at 74° C. in an attempt to crystalize the vinylidene chloride polymer. This sample is identified as INV-1-heated. The results are reported in the following Table I.

TABLE I

Evaluation of vinylaromatic resin - vinylidene chloride polymer compositions containing no expansion agent.

| Composition | Tensile Strength, psi | Elongation at break, % |
|---|---|---|
| PS-1 | 4727 | 2.3 |
| SAA-1 | 5176 | 3.8 |
| INV-1 | 3886 | 60.7 |
| INV-1-heated | 4451 | 4.3 |

The tensile test was performed according to ASTM D638-72, in which the force necessary to pull the specimen apart is determined, along with prestretch break. The instrument charts a stress-strain curve, with the total area under the curve being indicative of overall toughness. A comparison of the total area under the stress-strain curves indicates that the invention blends would be tougher than the noninvention PS-1 and SAA-1 compositions The heating of the invention-1 blend indicates that the toughness will be lost on aging because of crystalization of the vinylidene chloride polymer.

EXAMPLE 2

Following the procedure of Example 1, several vinylaromatic polymer-vinylidiene chloride polymer blends were prepared, employing an amorphous vinylidene chloride polymer comprising 87 weight percent vinylidene chloride and weight percent methyl acrylate The composition of the blends were as follows:

INV-2-20: 80 PBW polystyrene -92/acrylic acid -8; 20 PBW vinylidene chloride polymer.
INV-2-30: 70 PBW polystyrene -92/acrylic acid -8; 30 PBW vinylidene chloride polymer.
INV-2-40: 60 PBW polystyrene -92/acrylic acid -8; 40 PBW vinylidene chloride polymer.
INV-2-50: 50 PBW polystyrene -92/acrylic acid -8; 50 PBW vinylidene chloride polymer.

The blends were mixed in a Brabender mill at 170° C. for three minutes The resins were cooled, ground in a Wiley Mill rotary blade cutter and (1) compression molded into sheets to determine oxygen permeability and (2) molded into tensile specimens The tensile testing, which was performed in accordance with ASTM D638-72 as in Example 1, were compared against specimens molded from the styrene acrylic acid resin containing 8% acrylic acid, with the cross head being run at 0.11 inches per minute. The vinylaromatic resin in the following table is identified as SAA-2-8. The tensile test results are shown in the following Table II.

TABLE II

| Sample | Elongation at break, % | Tensile Strength, psi | Actual stress at break, psi |
|---|---|---|---|
| SAA-2-8 | 4.7 | 9000 | 9400 |
| INV-2-20 | 8.2 | 8660 | 9370 |
| INV-2-30 | 8.2 | 8660 | 9350 |
| INV-2-40 | 42.7 | 8106 | 11600 |
| INV-2-50 | 40.2 | 6490 | 9090 |

The data again show that the incorporation of the vinylidene chloride polymer into a vinylaromatic polymer results in a decrease in the tensile strength but also provides an increase in elongation at break. The data also show that the incorporation of the vinylidene chloride polymer does increase the elongation of the vinylaromatic resin and, in all cases, the area under the respective stress-strain curves show that the blends containing the vinylaromatic polymer would be tougher. The data also show that particularly beneficial results are obtained with blends which contain at least 30 weight percent of vinylidene chloride polymer.

The oxygen permeability of the invention blends was compared against a conventional polystyrene resin and the styrene-acrylic acid copolymer employed in this example. The polystyrene resin is identified as PS-2 and the styrene-acrylic acid copolymer is identified as SAA-2-8 with the invention compositions being as previously identified. The oxygen permeability was determined in cubic centimeters per ml of thickness per 100 square inches of surface per 24 hours per atmosphere. The tests were performed on molded samples having a thickness of approximately 6 mils The results are reported in the following table.

| Molded Sample | Oxygen Permeability |
|---|---|
| PS-2 | 330 |
| SAA-2-8 | 309 |
| INV-2-20 | 111 |
| INV-2-30 | 13 |
| INV-2-40 | 7 |
| INV-2-50 | 5 |

The data are self-explanatory, and show the significant reduction in oxygen permeability which is afforded when amounts as low as 20% by weight of vinylidene chloride polymer are incorporated into vinylaromatic polymer compositions.

Based upon the air permeability rates, supra, an estimated 5-year R value of possible foam samples made with the individual resins was calculated from the air permeability rates. These estimated 5-year R values are provided in the following table.

| Resin Composition | Oxygen Permeability of Polymer | R Value |
|---|---|---|
| Polystyrene | 320 | 4.9 |
| INV-2-40 | 5 | 5.3 |
| Polystyrene + aluminum facing | 320 | 6.6 |
| Polystyrene + 40% vinylidene chloride polymer + aluminum facing | 5 | 7.5 |

EXAMPLE 3

A blend of 30 grams of styrene-acrylic acid copolymer containing 8% acrylic acid, 20 grams of amorphous vinylidene chloride polymer (vinylidene chloride-87, methyl acrylate-13), 0.15 grams talc, 0.05 grams barium stearate, and 1 gram tetrasodiumpyrophosphate were melt blended in a Brabender mill for 3 minutes at 170° C. The polymer was cooled and ground in a Wiley Mill rotary blade cutter. Individual particles of the polymer blend were soaked in trichlorofluoromethane for four days, then in water for two days and expanded in an oven at 120° centigrade. The samples foamed to about 3 pcf and one mm cell size. Small samples of the foam did not continue to burn when ignited and only charred while flame touched the foam and caused burning. The foamed particles were more rubbery and less brittle than conventional foam beads made from polystyrene.

Of course, it is understood that the above is merely a preferred embodiment of the invention and various changes and alterations can be made without departing from the spirit and broader aspects thereof as set forth in the appended claims.

The embodiments of the invention in which an exclusive property or privilege is claimed or defined as follows:

1. Polymeric composition of matter having reduced oxygen permeability comprising at least one vinylaromatic polymer, from 1014 55% by weight of at least one polyvinylidene chloride polymer, and at least one blowing agent, wherein the amount of said polyvinylidene chloride polymer is based on the total weight of the polymer.

2. A composition according to claim 1 according to claim 1 wherein said vinylaromatic polymer comprises polystyrene.

3. A composition according to claim 1 wherein said vinylaromtic polymer comprises styrene-acrylic acid copolymer.

4. A composition according to claim 4 wherein said blowing agent is a physical blowing agent.

5. A composition according to claim 4 wherein said blowing agent comprises at least one halogenated hydrocarbon.

6. A composition of matter according to claim 1 wherein said vinylidene chloride polymer comprises at least one amorphous vinylidene chloride polymer.

7. A composition of matter according to claim 6 wherein said vinylaromatic polymer comprises polystyrene.

8. A composition according to claim 6 wherein said vinylaromatic polymer comprises styrene-acrylic acid copolymer.

9. A composition according to claim 1 wherein said blowing agent comprises at least one halogenated hydrocarbon.

10. A composition of matter according to claim 6 wherein the amount of said amorphous vinylidene chloride polymer is in the range of 30-50 weight percent.

11. A composition of matter according to claim 10 wherein said vinylaromatic polymer comprises polystyrene.

12. A composition of matter according to claim 10 wherein said vinylaromtic polymer comprises styrene-acrylic acid copolymer.

13. A composition of matter according to claim 6 wherein said vinylidene chloride polymer comprises vinylidene chloride-methyl acrylate copolymer.

14. A composition of matter according to claim 14 wherein said vinylaromtic polymer comprises styrene-acrylic acid copolymer.

* * * * *